June 28, 1960 J. E. COTTLE 2,943,082
POLYMER PURIFICATION AND SOLVENT RECOVERY PROCESS
Filed Nov. 8, 1954
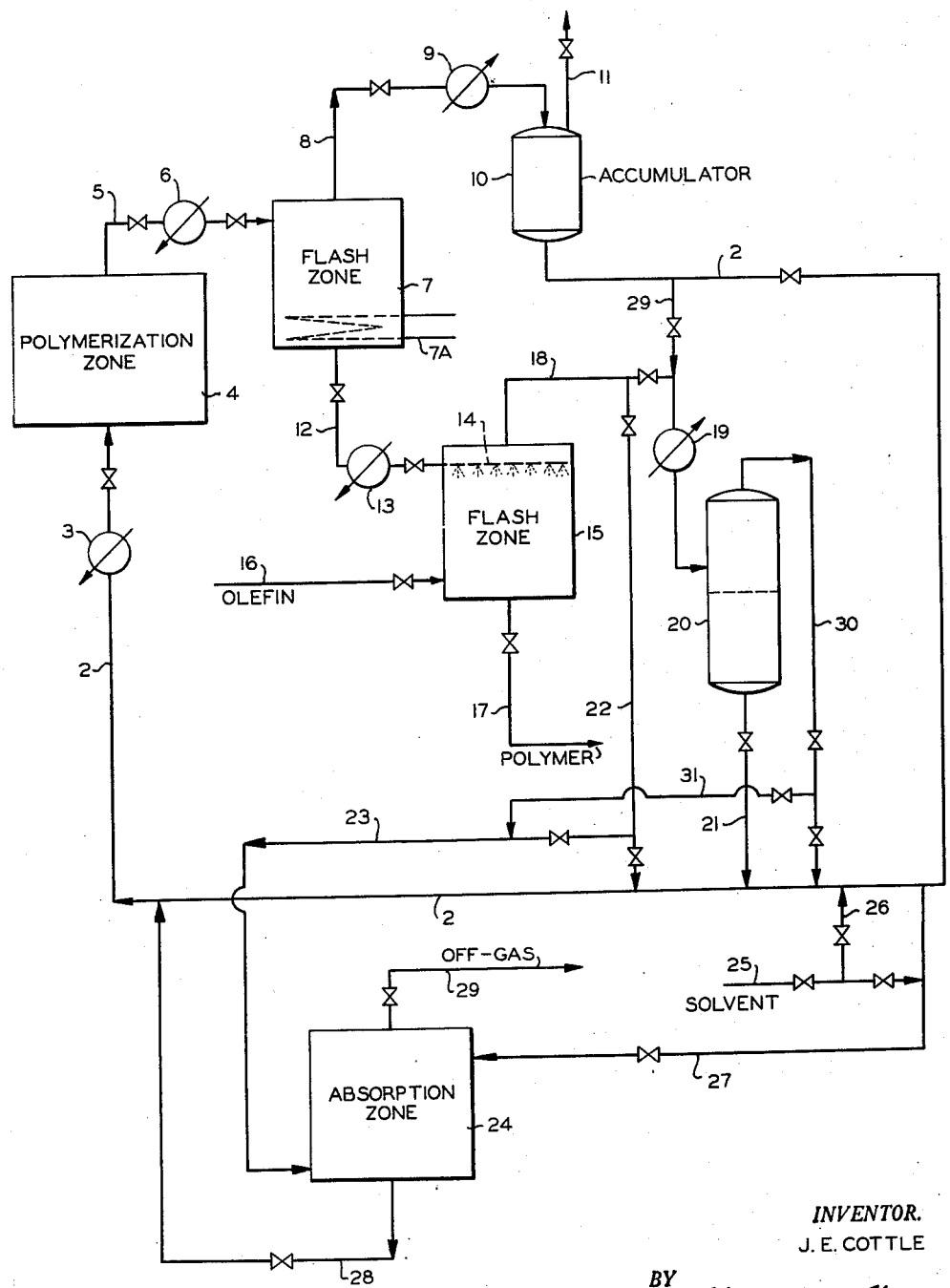
INVENTOR.
J. E. COTTLE
BY Hudson and Young
ATTORNEYS United States Patent Office 2,943,082
Patented June 28, 1960

2,943,082

POLYMER PURIFICATION AND SOLVENT RECOVERY PROCESS

John E. Cottle, Bartlesville, Okla., assignor to Phillips Petroleum Company, a corporation of Delaware Filed Nov. 8, 1954, Ser. No. 467,464

11 Claims. (Cl. 260—93.7)

This invention relates to the production of polymer. In one aspect it relates to a method for recovering a polymer from a solution of the same. In another aspect it relates to a method for the recovery of a solvent.

The copending application of J. P. Hogan and R. L. Banks, Serial No. 333,576, filed January 27, 1953, now abandoned, discloses and claims a method of producing unique polymers of aliphatic 1-olefins having a maximum chain length of 8 carbon atoms and no chain branching nearer the double bond than the 4-position by polymerizing such olefins in the presence of a catalyst comprising chromium oxide, including a substantial amount of hexavalent chromium, associated with at least one additional porous solid, especially silica and/or alumina. In many cases, it is preferable to carry out the polymerization reaction in the presence of a hydrocarbon solvent which is liquid and chemically inert under the polymerization conditions. Such solvents include paraffinic hydrocarbons and naphthenic hydrocarbons. Examples are normal pentane, normal and isohexanes, normal heptane, normal octane, isooctanes such as 2,2,4-trimethylpentane, normal nonane, isononanes, cyclohexane, methylcyclohexane, cyclopentane and methylcyclopentane. It is necessary to provide a method for separating the product polymer from the solvent. Several methods have been utilized for such a separation. One method is to remove the solvent from the solvent-polymer mixture by vaporization of the solvent. This can be accomplished by fractional distillation or by flashing. The hydrocarbon effluent recovered from the polymerization reactor usually comprises a major proportion of the solvent and a relatively small proportion of polymer. The recovery of the polymer by flashing the solvent is an advantageous method of recovery, since it can be accomplished in relatively simple equipment. The removal of the major portion of the solvent is comparatively simple. However, as the mixture becomes more concentrated with respect to polymer, it becomes viscous and the removal of the last traces of solvent is slow. In order to facilitate the removal of the last traces of solvent, it is desirable to use a stripping gas to facilitate the vaporization of the solvent.

As heretofore practiced, the use of a stripping gas in the recovery of a solvent, especially where the stripping gas is one which condenses only at comparatively low temperatures, has had the disadvantage that the gas removed from the stripping zone contains only a small concentration of the vaporized solvent and is composed preponderently of the stripping gas. The recovery of the solvent from this dilute mixture is rather difficult. In the past, such recovery, especially in connection with processes other than polymerization, has been effected by contacting the mixture with an adsorbent such as activated carbon which adsorbs the solvent vapor and permits recovery of the adsorbed solvent by subsequent heating. This method is generally not desirable because it requires the installation of a complex solvent recovery system and because the adsorbents which are suitable for this purpose are expensive.

The present invention effects the recovery of solvent and polymer in a process for the production of olefin polymers, utilizes a flashing operation employing a stripping gas, and eliminates the previously described disadvantages which have heretofore accompanied the use of a stripping gas for solvent recovery purposes.

According to this invention, a mixture comprising a high-boiling reaction product of an olefin, together with a relatively low-boiling solvent for said product, is resolved by effecting the flashing of at least part of the solvent in the presence of a stripping gas, and utilizes, as said stripping gas, the olefin which is used as the feed material in the reaction step in which the product is formed, said olefin then being passed to the reaction step together with recovered solvent.

In one embodiment of the invention, ethylene is converted to polyethylene by polymerizing in the presence of a chromium oxide polymerization catalyst of the type already described, the polymerization being effected in the presence of a normally liquid non-olefinic hydrocarbon such as isooctane or cyclohexane. The hydrocarbon effluent comprising polyethylene and solvent is subjected to a flashing operation to remove and recover the solvent. During the flashing of the last traces of the solvent from the polymer, ethylene is utilized as the stripping gas to facilitate vaporization of the solvent from the polymer, and the effluent gas from the stripping step which gas comprises ethylene and solvent, is passed to the polymerization step. The entire ethylene feed can be passed through the stripping zone, if desired. The problem of recovering small amounts of solvent from large volumes of gas is thus eliminated and the effluent stripping gas from the stripping step is of such a composition that it can be directly used as polymerization feed without any need for a separate step for recovering the solvent therefrom. Although the effluent stripping gas can be cooled to condense part of the solvent therein, no ultimate separation of feed olefin from solvent is necessary.

The drawing, which is a schematic flow diagram, illustrates several methods of practicing the invention. Certain pumps, compressors, heat exchangers and other auxiliary equipment known in the art have been omitted for the sake of simplicity.

As shown in the drawing, a reaction mixture comprising a 1-olefin of the type described and the solvent pass through conduit 2 to polymerization zone 4. For purposes of illustration, the olefin can be considered to be ethylene. However, other olefins, as described in the cited application of Hogan and Banks, e.g., propylene, 1-butene, 1-pentene, 1-hexene, 1-heptene or 1-octene, can be used. Also, for purposes of illustration, the solvent can be considered to be cyclohexane, although other paraffinic or naphthenic hydrocarbons, previously described herein, can likewise be used.

As disclosed more fully in the cited copending application of Hogan and Banks, the polymerization is conducted at a temperature in the range 150 to 450° F. Heat exchanger 3 is therefore provided in order to raise the temperature of the feed to a suitable value. This is usually somewhat below the desired polymerization temperature, since the polymerizaiton reaction is exothermic.

For the sake of simplicity, polymerization zone 4 can be considered as a reactor containing a fixed bed of catalyst through which the feed flows in liquid phase.

Polymerization zone 4 contains a catalyst, e.g., a chromium oxide-silica-alumina catalyst prepared by impregnating a pelleted, coprecipitated silica-alumina composite gel with an aqueous solution of chromium trioxide, drying, and heating at an elevated temperature, e.g., 950° F. in a stream of anhydrous air for a period of 4 to 8 hours.

The final catalyst can contain from 0.2 to 10 percent chromium in the form of the oxide, and it is desirable that a substantial proportion, preferably at least 0.1 weight percent of the catalyst, be hexavalent chromium.

Polymerization zone 4 is maintained at a temperature in the range 150 to 450° F. and a pressure sufficient to maintain the feed predominantly in the liquid phase. This pressure is ordinarily in the range 200 to 700 p.s.i. In a fixed-bed process of the type here illustrated, the space velocity is in the range 1 to 20 liquid volumes of feed per volume of catalyst per hour.

The hydrocarbon effluent passes through conduit 5 and can be heated to a suitable temperature, preferably not over about 450° F., by means of heat exchanger 6 and is passed into flash zone 7, which is maintained at a pressure substantially lower than that in reactor 4 and sufficiently low so that most of the solvent will vaporize almost instantaneously. A heater 7A, e.g., a steam coil, is provided in zone 7 to promote solvent vaporization. The vaporized material is passed through conduit 8 and condenser 9, in which it is condensed, the condensate being passed to accumulator 10. Any uncondensed gas can be removed as desired through vent line 11. Condensed liquid solvent can be recycled through conduit 2, as subsequently described.

The unvaporized material in flash zone 7, which will ordinarily consist of polymer containing from 50 to 80 weight percent solvent, is passed through line 12 and again heated in heat exchanger 13 to a temperature (e.g., 300–400° F.) suitable for the vaporization of the remaining solvent. The heated mixture is passed through line 12 to flash zone 15, which is maintained at a pressure below that in zone 7, and preferably enters this zone through a spray or comminution device indicated at 14. Feed ethylene or other reactant olefin in the gas or vapor phase enters flash zone 15 through inlet 16 and passes upwardly and countercurrently with respect to the incoming solvent-polymer mixture. Zone 15 can be provided with contact-promoting devices, such as packing, trays, or baffles, not shown. The ethylene can be heated to a temperature at least as high as that of the polymer mixture, by means not shown. When the reactant olefin is normally liquid, it is preferably used in the form of superheated vapor. Product polymer substantially free of solvent is withdrawn through outlet 17, usually in the molten state and is passed to suitable processing, such as degassing, if desired, and extrusion or molding. The vaporized material from flash zone 15 is passed through conduit 18 and condenser 19 to accumulator 20. Solvent, condensed as previously described, and collected in accumulator 10, can be recycled to polymerization zone 4 through conduit 2. Preferably, at least part of the solvent from accumulator 10 is passed through conduits 29 and 18 in which it is mixed with the vaporized mixture from flash zone 15. The resulting mixture then passes into condenser 19. The presence of the increased volume of liquid supplied through conduit 29 facilitates the condensation of the solvent recovered in flash zone 15 and also results in the formation of a solution of the ethylene in the solvent. Such a solution is frequently desired for the polymerization reaction. In accumulator 20, the condensed mixture separates into a liquid phase and a vapor phase. The liquid phase can be passed through conduit 21 and recycled through conduit 2. The vapor phase can be withdrawn from accumulator 20 through conduit 30 and passed into recycle conduit 2.

As previously stated, it is often desirable to utilize, as feed to polymerization zone 4, a solution of the reactant olefin in the solvent. According to one modification of this invention, the gas phase from accumulator 20 passes through conduits 30, 31 and 23 to absorption zone 24 wherein it contacts liquid solvent, which enters through line 27 and countercurrently flows downwardly, absorbing olefin fed to the absorption zone through inlet 23. The solvent supplied to absorption zone 24 can be recycled solvent drawn from conduit 2 and/or fresh solvent supplied to the system through conduit 25. (Branch conduit 26 is provided so that part of the fresh solvent, or all thereof, can be added directly into recycle line 2.) Absorption zone 24 is operated under conditions suitable for the formation of a solution of the olefin in the solvent as is described more fully in the copending application of M. R. Cines, Serial No. 441,129, filed July 2, 1954, now U.S. Patent 2,827,444 (March 18, 1958). Any unabsorbed gas, including methane, ethane or similar inert material present in the feed ethylene, is withdrawn through outlet 29. The bottom product from absorption zone 24, which product comprises a solution of ethylene in the solvent, is passed through conduit 28 to recycle conduit 2 and to polymerization zone 4.

According to another modification of the invention, part or all of the vaporized material from flash zone 15, can be by-passed around condenser 19 and passed directly through conduit 22 to recycle conduit 2 without any condensation. In another modification, the uncondensed material can be passed through conduits 22 and 23 to absorption zone 24.

In a system of the type described, the flash zones are maintained at a temperature and a pressure sufficient to effect flashing of the solvent. The temperature is ordinarily in the range 300 to 400° F. and the pressure can range from just below the vapor pressure of the mixture at said temperature down to a vacuum as low as can practically be obtained. Pressures of the order of 10 to 80 p.s.i.a. are suitable, the pressure in any particular case depending on the volatility of the solvent. The second flash zone is preferably maintained at a temperature at least as high and a pressure at least as low as that in the first flash zone.

Although illustrated in connection with an olefin polymerization process of the type described in the cited Hogan and Banks application, the invention is not limited to this type of operation, but is generally applicable to any process wherein an olefin in admixture with a solvent is reacted to form a product which is materially higher boiling than the solvent and the solvent is subsequently removed from the product by vaporization. Examples are processes wherein normally gaseous olefins are polymerized to form lubricating oils and processes wherein such olefins are used to alkylate aromatics and thus form high-boiling alkyl aromatic compounds.

*Example*

An ethylene stream comprising 85.3 percent ethylene, 9.0 weight percent methane and 5.7 weight percent ethane is deoxygenated by contact with copper turnings and is mixed with a solvent which has a boiling range of 175 to 260° F. and is produced by the fractional distillation of an isoparaffinic material obtained by alkylating isobutane with a mixture of butylenes in the presence of hydrogen fluoride. The 175 to 260° F. fraction contains 2,2,4-trimethylpentane as its major component. The solvent and the ethylene stream are mixed in such proportions that a solution containing approximately 1.2 weight percent ethylene results. This solution is contacted, at 340° F., 415 p.s.i.a., and a liquid hourly space velocity of 2, with a fixed bed of catalyst prepared by impregnating a coprecipitated composite of silica and alumina containing 90 weight percent silica and 10 weight percent alumina with an aqueous solution of chromium trioxide, drying, and heating the resulting composite in a stream of anhydrous air at a temperature of 930° F. for a period of 6 hours. The catalyst has a chromium content of 2 weight percent and a hexavalent chromium content of approximately 1 percent, as determined by leaching the finished catalyst with water and determining the amount of chromium in the leachings. The effluent from the reactor comprises 0.1 weight percent methane, 0.1 weight percent ethylene, 0.1 weight percent ethane, 98.6 weight percent solvent, and 1.1 weight percent polymer and is passed to a flash chamber maintained at approximately 300° F. and 65 p.s.i.a. The flash chamber is heated by means of a steam coil. The vaporized solvent is condensed and recycled to the polymerization reactor. The unvaporized material from the flash chamber is passed to a second flash chamber maintained at 300° F. and 60 p.s.i.a. The entire amount of ethylene used to prepare the polymerization feed is passed through the flash zone countercurrently with respect to the polymer mixture. The polymer mixture entering the second flash zone comprises approximately 40 weight percent polymer and 60 weight percent solvent. The vapor effluent from the second flash zone is directly admixed with the condensed solvent from the first flash zone and recycled to the polymerization reactor. The bottom product from the second flash chamber is a 12,000 molecular weight polyethylene containing less than 0.3 weight percent of solvent.

From the foregoing, it will be seen that I have provided, in a process for reacting an olefin in the presence of a solvent to obtain a high-boiling product, the improvement which comprises removing at least part of the solvent from the product by flashing in the presence of the olefin which is used as the feed and passing the mixture of olefin and vaporized solvent from the flashing step to the reaction step. While certain process steps, structures, and examples have been shown for purposes of illustration, it is clear that the invention is not limited thereto. Variation and modification are possible within the scope of the disclosure and claims. For example, part of the ethylene feed in the system shown in the drawing can be supplied directly to conduit 2, and/or part can be supplied to conduit 23 and absorption zone 24. Although the invention is especially beneficial in connection with a process in which ethylene is converted to brittle solid polymer by contacting with a fixed bed of chromium oxide catalyst at a temperature in the range 275 to 375° F., the invention is not limited to use in connection with this type of contacting. The invention can be practiced in connection with polymerization processes utilizing mobile catalyst techniques.

I claim:

1. In a process wherein an aliphatic 1-olefin having a maximum chain length of 8 carbon atoms and no chain branching nearer the double bond than the 4-position is converted to normally solid polymer by polymerization in a polymerization zone in the presence of a chromium oxide polymerization catalyst and a hydrocarbon which is inert under the polymerization conditions and is a solvent for the resulting polymer, the improvement which comprises vaporizing most of said solvent from said polymer and subjecting the unvaporized material to solvent vaporization conditions in a gaseous stream of said olefin, recovering said olefin and said solvent in admixture, and passing the recovered olefin and the recovered solvent to the polymerization zone.

2. A process according to claim 1 wherein said olefin is ethylene and said solvent comprises 2,2,4-trimethylpentane.

3. A process according to claim 1 wherein said olefin is ethylene and said solvent is cyclohexane.

4. A process according to claim 1 wherein said olefin is ethylene and said solvent is methylcyclohexane.

5. A process according to claim 1 wherein said olefin is propylene and said solvent is n-heptane.

6. A process according to claim 1 wherein said olefin is propylene and said solvent is n-nonane.

7. A process according to claim 1 wherein said admixture is passed directly to said polymerization zone.

8. In a process in which ethylene is converted to normally solid polymer by contacting said ethylene, in admixture with a hydrocarbon solvent for said ethylene and said polymer, with a chromium oxide-containing polymerization catalyst in a polymerization zone, the improvement which comprises subjecting a resulting mixture of polymer and solvent to flash vaporization whereby most of said solvent is removed as vapor from said polymer, subjecting the unvaporized residue, containing polymer and solvent, to flash vaporization conditions in a flashing zone, passing a stream of ethylene through said flashing zone, recovering, unvaporized, a substantially solvent-free polymer, recovering a vaporized fraction comprising said ethylene and said solvent, and passing said fraction to said polymerization zone.

9. A process according to claim 8 wherein said vaporized fraction is passed directly to said polymerization zone.

10. A process according to claim 8 wherein said vaporized fraction is admixed with solvent vaporized in said first-mentioned flash vaporization, the resulting mixture is subjected to solvent-condensing temperature and pressure to form a liquid phase and a vapor phase, and each of said phases is passed to said polymerization zone.

11. A process according to claim 8 wherein said vaporized fraction is admixed with solvent vaporized in said first-mentioned flash vaporization, the resulting mixture is subjected to solvent-condensing temperature and pressure to form a liquid phase and a vapor phase, said liquid phase is passed to said polymerization zone, said vapor phase is contacted with a quantity of said solvent to form a solution of ethylene, and said solution is passed to said polymerization zone.

References Cited in the file of this patent

UNITED STATES PATENTS

| | | |
|---|---|---|
| 2,187,877 | Ferris et al. | Jan. 23, 1940 |
| 2,691,647 | Field et al. | Oct. 12, 1954 |
| 2,692,259 | Peters | Oct. 19, 1954 |
| 2,742,452 | Heisenberg et al. | Apr. 17, 1956 |
| 2,820,779 | Dale | Jan. 21, 1958 |